Aug. 17, 1937. A. STOLL 2,090,337
VALVE ACTUATING MECHANISM
Filed March 5, 1935 3 Sheets-Sheet 1
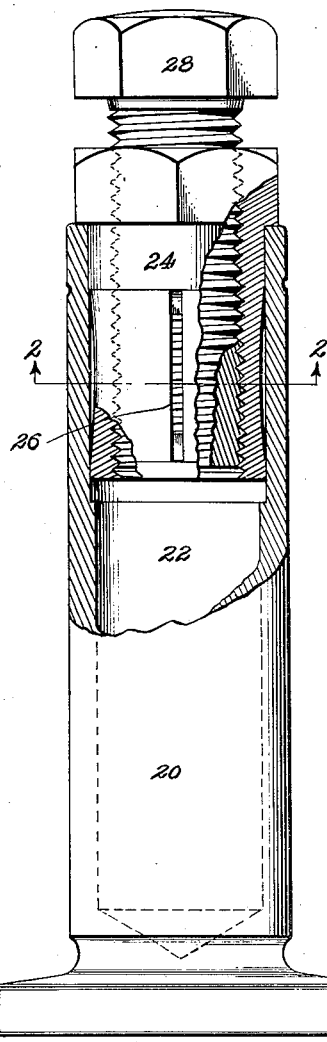
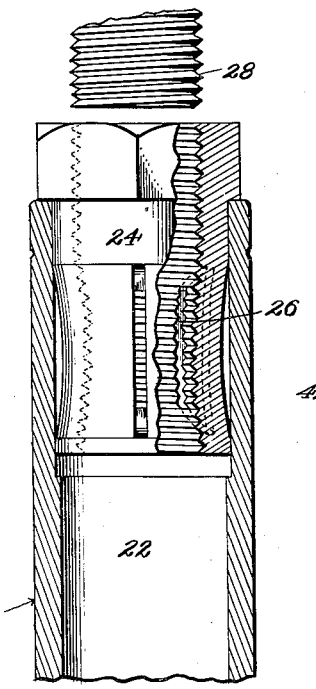
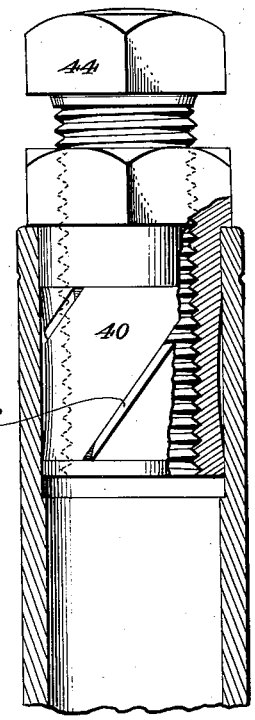
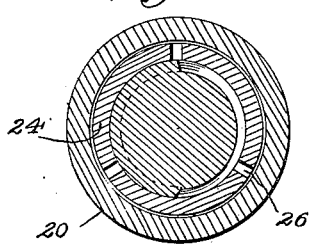
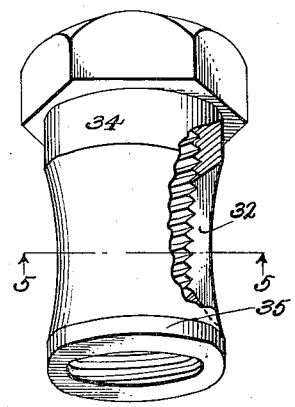
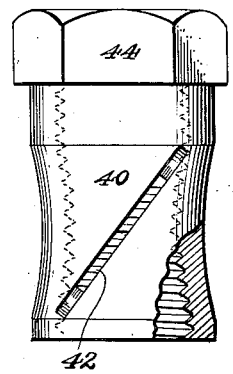
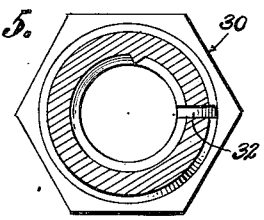
INVENTOR
ALBERT STOLL Aug. 17, 1937.  A. STOLL  2,090,337
VALVE ACTUATING MECHANISM
Filed March 5, 1935  3 Sheets-Sheet 2
Fig.8.  Fig.9.  Fig.10.
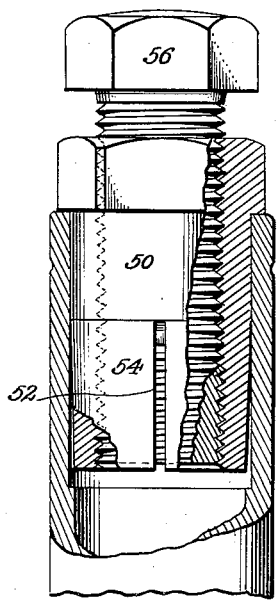
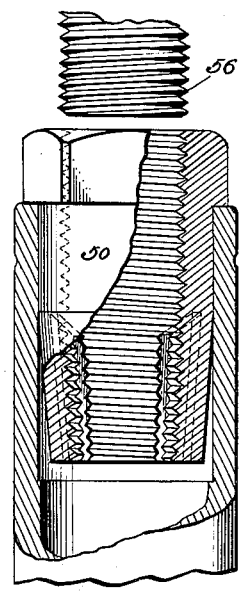
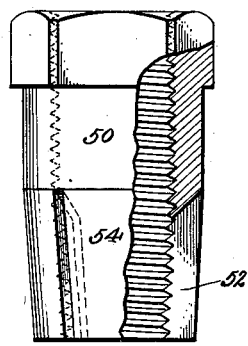
Fig.11.
Fig.12.  Fig.13.
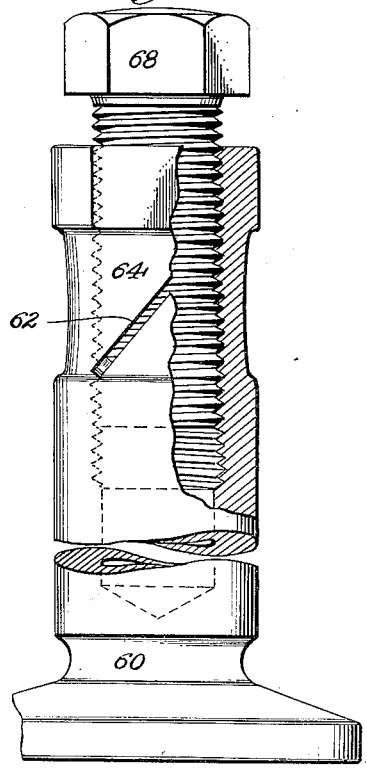
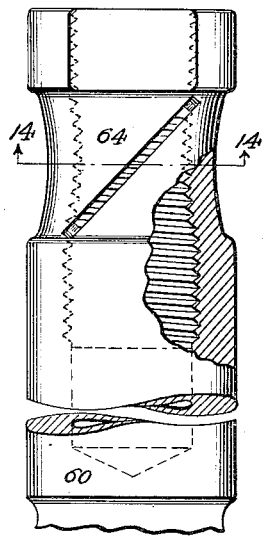
Fig.14.
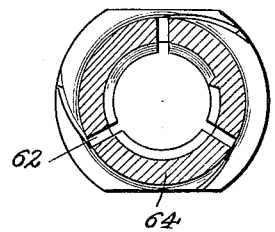
INVENTOR
ALBERT STOLL Aug. 17, 1937.  A. STOLL  2,090,337
VALVE ACTUATING MECHANISM
Filed March 5, 1935  3 Sheets-Sheet 3
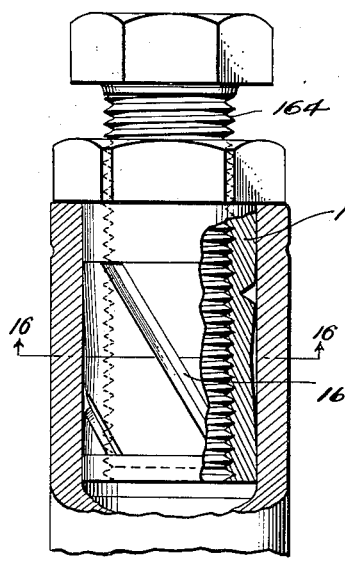
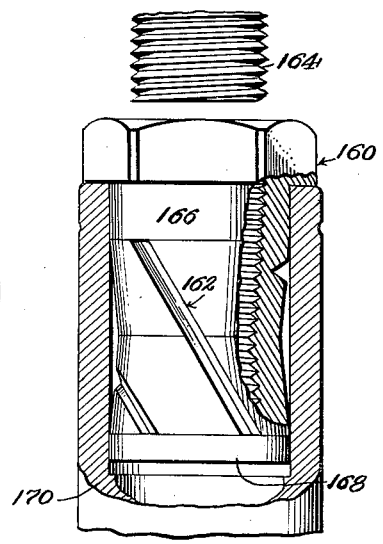
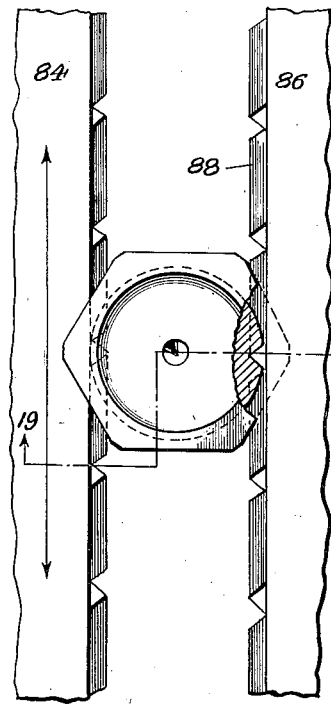
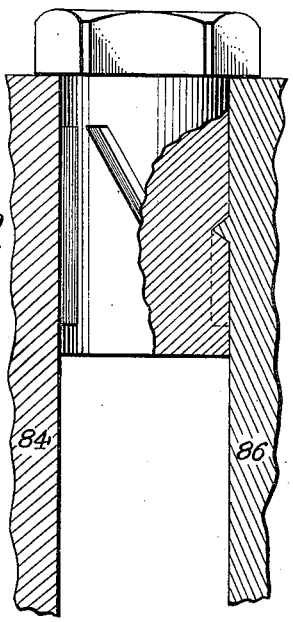
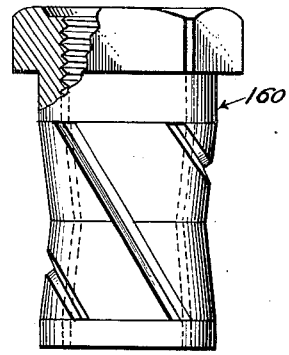
INVENTOR
ALBERT STOLL Patented Aug. 17, 1937

2,090,337

UNITED STATES PATENT OFFICE 2,090,337

VALVE ACTUATING MECHANISM

Albert Stoll, Detroit, Mich., assignor to Clare L. Brackett, Detroit, Mich.

Application March 5, 1935, Serial No. 9,469

15 Claims. (Cl. 123—90)

This invention relates to tappets especially adapted for use in internal combustion engines.

Briefly, the invention contemplates a tappet having simple and constantly effective means by which the impact screw of a tappet may be held in any desired or required position of adjustment without the aid of a separate fastening device such as the lock nut ordinarily employed for this purpose, to the end that adjustment of the tappet for clearance is expedited and simplified, in addition to which there is to be considered the saving in weight due to the elimination of the separate lock nut or its equivalent, of whatever nature the latter happens to be.

More specifically, the invention looks to a tappet screw receiving body or member having a series of circumferentially spaced arcuate clutch elements for effective frictional contact with the threads of the tappet screw to resist rotation of the screw under such disturbing influences as vibration and intermittent impact.

It has been found that there is an approach to an ideal thread condition by the employment of a tappet screw receiving body with an inwardly acting clutch to engage the associated screw because, both the upper and lower flanks of the thread on the screw receiving body are brought into close and effective contact with the upper and lower flanks of the thread on the tappet screw as distinguished from conventional tappets in which the entire load is transmitted from the lower flanks of the thread on the tappet screw to the upper flanks of the thread on the jam or lock nut.

From the foregoing, it will be seen that there is a compound restraining action exerted on the tappet screw, this being due first, to the vastly increased area of frictional contact between the threads of the tappet screw and the threads of the surrounding screw receiving body or member and second, to the clutching action exerted on the tappet screw by the surrounding clutch.

In addition, the structure and mounting of the screw receiving ferrule will be found to be important, and by way of brief preliminary reference thereto it is pointed out that the screw clutching portion of the ferrule is mounted within and is thus protected and shielded by the tappet body against destructive engagement by tappet adjusting tools and against the accumulation of grit and other foreign matter. Also, the clutch forming slot or slots in the ferrule will be found to terminate short of the ends of the ferrule to define unbroken annuli integral with the ends of the clutch so as to support the clutch from both ends thereof and such annuli are closely fitted within and are braced by the tappet body so as to maintain the initial concentricity of the ferrule.

The invention also aims to provide a tappet which is rugged, light, relatively cheap to manufacture, and one which provides for the employment of a tappet screw of conventional design.

In the accompanying drawings forming a part of this application and in which like numerals are employed to designate like parts throughout the same, Figure 1 is a side elevation of the improved tappet, parts being broken away, Figure 2 is a sectional view taken on line 2—2 of Figure 1, Figure 3 is a fragmentary group view of the tappet, partly in section and partly in elevation, the screw being shown in position for entrance to the screw receiving ferrule, Figure 4 is a perspective, partly in section, of a modified form of tappet screw receiving ferrule detached, Figure 5 is a transverse sectional view taken on line 5—5 of Figure 4, Figure 6 is a detail vertical sectional view through a further modification of the invention, parts being in elevation, Figure 7 is a side elevation, partly in section, of the tappet screw receiving ferrule shown in Figure 6, Figure 8 is a detail vertical sectional view, partly in elevation, through another expression of the invention, Figure 9 is a fragmentary group view, partly in section and partly in elevation, with the tappet screw in position for attachment to the body of the tappet.

Figure 10 is a side elevation, partly in section, of the tappet screw receiving ferrule shown in Figures 8 and 9, Figure 11 is an end elevation of the ferrule shown in Figure 10, Figure 12 is a fragmentary side elevation, partly in section, disclosing a further modification of the invention with the tappet screw applied, Figure 13 is a fragmentary group view partly in elevation and partly in section disclosing the parts shown in Figure 12, the tappet screw being in position for application, Figure 14 is a horizontal sectional view taken on line 14—14 of Figure 13.

Figure 15 is a detail vertical sectional view disclosing another form of the invention, parts being in elevation, Figure 16 is a horizontal sectional view taken on line 16—16 of Figure 15, Figure 17 is a fragmentary group view of the tappet, shown in Figure 15, parts being in section and parts being in elevation and the tappet screw being shown in position for entrance to the screw receiving ferrule, Figure 18 is a fragmentary plan view disclosing one step in a method of manufacturing which may be pursued in the production of the ferrule disclosed in Figures 15, 16 and 17, Figure 19 is a sectional view taken on line 19—19 of Figure 18, Figure 20 is a side elevation of the ferrule shown in Figures 15, 16 and 17, and partly broken away.

In the drawings, the numeral 20 designates a tappet body or member having a longitudinal bore 22, the upper or outer portion of which receives a ferrule or tappet screw receiving member 24.

The ferrule 24 is shown to be snugly positioned in the bore 22 and has the outer portion thereof formed with a polygonal head resting upon the upper or outer end of the body 20. Of course, suitable means such as spot welding may be employed to fasten the ferrule 24 in place against rotation with respect to the tappet body.

As shown in Figures 1, 2 and 3 the ferrule 24 is provided with a series of circumferentially spaced parallel longitudinally extending slots 26 defining intervening transversely curved clutch elements of leaf spring form. In manufacture, the slotted portion of the ferrule 24 is rolled inward so as to bow the clutch elements from end to end and toward the longitudinal center of the ferrule.

Thus, the clutch elements are transversely and longitudinally curved for effective frictional contact with the adjacent portion of the tappet screw 28.

Figure 3 illustrates the longitudinal curvature of the clutch elements when the tappet screw 28 is not in place and by a comparison of this figure with Figure 1, it will be seen that the introduction of the tappet screw has the effect of pressing outwardly on the clutch elements and thus loading the same to values where such clutch elements offer effective frictional resistance to the rotation of the tappet screw under such contrary influences as vibration and intermittent valve actuation. However, while the restraining influence of the clutch elements is ample to inhibit uncontrolled rotation of the tappet screw, the force exerted by such clutch elements is insufficient to prevent expeditious adjustment of the tappet screw with the aid of a wrench such as is ordinarily employed for this purpose.

Hence, the tappet screw may be held accurately in adjustment without the aid of the conventional lock nut or its equivalent. This not only facilitates adjustment but at the same time avoids the weight of the lock nut.

With the clutch elements in pressure and frictional contact with the adjacent portions of the tappet screw, there is an approach to an ideal thread condition. Such is true because the internal threads of the ferrule have both the upper and lower flanks thereof in close contact with the upper and lower flanks of the tappet screw. This is in direct contrast to conventional construction in which only the upper flanks of the threads of the lock nut have close contact with only the lower flanks of the thread on the tappet screw, leaving an absence of effective frictional engagement between the lower flanks of the nut threads and the opposed or upper flanks of threads of the tappet screw. Thus the employment of frictional clutch elements after the fashion shown herein provides maximum and effective area of frictional contact between the ferrule and the associated tappet screw. Such area of contact is vastly greater than that to be found where an ordinary jam nut is employed to lock the tappet screw against turning.

This enlarged area of contact is due first, to the superior length of the clutch elements as compared to the axial dimension of a conventional lock nut and second, to the engagement of major portions of the upper and lower flanks of the threads on the ferrule with the major portions of the upper and lower flanks of the threads of the tappet screw. It is this increased area of contact that provides the frictional engagement by which the tappet screw is so firmly held in place against uncontrolled turning.

That is to say, the construction herein shown provides for a compound restraining action by which the tappet screw is securely held in adjustment. In explaining this it is pointed out that such compound action is due first, to the tremendously increased area of frictional engagement between the threads of the tappet screw and the threads of the surrounding screw body and second, to the clutching action exerted on the tappet screw by the surrounding clutch elements.

It is believed that I am the first to appreciate that a vastly increased area of frictional engagement between the threads of the tappet screw and the threads of the surrounding body may be employed in concert with the restraining force of surrounding clutch elements to hold the screw against shifting as an incident to operation of the internal combustion engine of which the tappet forms a part.

Originally, the clutch elements occupy the bowed or longitudinally curved form disclosed in Figure 3. By reason of such curvature of the clutch elements, the inner portions of the clutch elements are disposed in the path of advance of the tappet screw 28 so that as an incident to the advance of the tappet screw to the position suggested in Figure 1, the clutch elements are forced radially outward and are thus loaded for effective action in inhibiting uncontrolled shifting of the screw. When the clutch elements have been loaded from the inner sides thereof, the same will have acquired self-contained, inwardly acting power rendering the clutch elements self-acting. This avoids the need of locating the clutch portion of the ferrule exteriorly of the tappet body where the same would be available for engagement by a clutch contracting means such as a nut.

It is important to observe that the slots 26 terminate short of the ends of the ferrule and thus leave unbroken annuli at the ends of the clutch elements to support the clutch elements at both ends thereof for greater strength and at the same time to assist in holding the clutch elements about a common axis.

It is highly advantageous to position the main portion of the ferrule within the tappet body. This is true for several reasons. Among these might be mentioned the fact that the slotted portion of the ferrule is protected and shielded by the surrounding tappet body against destructive contact by such things as tappet adjusting tools and against accumulation of dirt and grit.

In addition, the annuli at the ends of the slotted portion of the ferrule are closely surrounded and braced by the tappet body so as to preserve the concentricity of the ferrule. Thus, by rendering the clutch elements self-acting, I am enabled to avail myself of the advantages flowing from mounting the clutch portion of the ferrule within the tappet body.

By special reference to Figure 3 it will be seen that the slots 26 decrease in axial dimension in the direction of the longitudinal center of the ferrule so as to maintain maximum thread length in that part of the ferrule which has frictional restraining engagement with the tappet screw.

Figures 4 and 5 disclose a slightly modified form of ferrule 30 having but a single slot 32 defining a longitudinally split clutching portion for restraining engagement with the shank of the tappet screw. It is clearly illustrated in Figure 4, that the slot 32 terminates short of the ends of the ferrule so as to leave unbroken annuli 34 and 35 at the ends of the ferrule to brace the intervening clutching portion against distortion. Also, the annuli at the ends of the ferrule are closely surrounded by the tappet body and maintain the original concentricity of the ferrule and brace the ferrule in its position.

In the form of invention disclosed in Figures 6 and 7, the ferrule is designated by the numeral 40 and is provided with an annular series of slots 42 defining intervening clutch elements for frictional and restraining contact with the adjacent portion of the tappet screw 44. The slots 42 extend angularly or helically as distinguished from the slots 26 which extend parallel to the longitudinal axis of the ferrule.

In the form of invention disclosed in Figures 8, 9 and 10, the ferrule is designated by the numeral 50 and is provided with a series of longitudinal slots 52 opening out through the lower end of the ferrule and defining an annular series of interventing clutch elements 54. These clutch elements are rolled or pressed inward for effective frictional engagement with the adjacent portion of the tappet screw 56 so as to hold the tappet screw against uncontrolled turning. The clutch elements are rolled or pressed inward for effective frictional engagement with the adjacent portion of the tappet screw 56 so as to hold the tappet screw against uncontrolled turning. The clutch elements 54, by reason of being rolled inward, are curved longitudinally or as might be otherwise expressed, are bowed from end to end and, of course, at the same time are curved transversely which leads to the statement that the clutch elements are of compound curvature.

In the form of invention illustrated in Figures 12, 13 and 14, the tappet body 60 is bored longitudinally, of course, and at a point adjacent to and yet spaced from the upper end thereof is rolled inward and is of a reduced wall thickness as compared to the remaining portion of the body.

The reduced upper portion of the body 60 is shown to be formed with an annular series of spaced slots 62 defining an annular series of intervening clutch elements 64. Such clutch elements are bowed inward from end to end so that when the tappet screw 68 is applied, the clutch elements 64 will be forced radially outward, possibly to the positions shown in Figure 12 and thus loaded for restraining frictional contact with the tappet screw. Of course, there is a close engagement between the upper and lower flanks of the threads of the tappet body on one hand and the upper and lower flanks of the threads on the screw on the other hand, depending on the original accuracy of the complemental threads.

The slots 62 are shown to extend helically or angularly, as distinguished from parallel to the axis of the tappet, so as to increase the length of and thus render the interventing clutch elements somewhat more resilient than they might otherwise be, although it is entirely within the purview of the invention to have the slots extend longitudinally of the tappet as shown in connection with several other forms of the invention.

Referring now to Figures 15, 16 and 17, it will be seen that the ferrule 160 may be formed in the body portion thereof, with an annular series of grooves or depressions 162 defining intervening clutch elements for frictional and gripping engagement with the adjacent portion of the tappet screw 164. Although the grooves do not penetrate the wall of the ferrule, the same nevertheless give to the adjacent portion of the ferrule a resiliency ample for the desired clutching action. The employment of the grooves 162, as distinguished from slots, provides the strength inherent in an unbroken wall. However, the resiliency resulting from the employment of the grooves 162 is comparable to the resiliency found in a slotted ferrule having a substantially greater wall thickness. In other words, the use of grooves allows of the employment of a ferrule having a wall thickness less than that required in a slotted ferrule.

The ferrule 160 is shown to be internally threaded for the full length thereof and the clutching portion is rolled inward or is otherwise internally and externally constricted between the ends thereof, so as to define an annular series of clutch elements. Such clutch elements are initially located in the path of advance of the tappet screw 164, so that the clutch elements are loaded as an incident to the advance of the tappet screw to an operative range.

The grooves or depressions 162 are shown to extend angularly or helically so as to give to the associated clutch elements a helical form adding to the resiliency of these parts.

The grooves 162 are shown to terminate short of the ends of the ferrule, so as to leave unbroken annuli 166 and 168 at the ends of the ferrule and integral with the intervening clutch elements. Such annuli 166 and 168 are shown to be snugly or closely positioned within the surrounding tappet body 170, so as to center the ferrule and at the same time maintain the original concentricity of the ferrule. Of course, the annuli 166 and 168 also brace and strengthen the clutch elements.

Figures 18 and 19 illustrate one manner in which the ferrule 160 may be grooved. These figures illustrate stationary and moving die members 84 and 86 respectively, having the working faces thereof formed with ribs 88 for engagement with the metal from which the ferrule is formed. It is believed to be apparent that the movement of the die 84 with respect to the die 86 rotates the intervening material so as to form grooves or depressions therein and when the metal is later drilled and tapped, the resulting product is represented by the ferrule 160. As one of the final steps in production, the ferrule is rolled or otherwise constricted between the ends thereof so as to bow the clutch elements inward toward the center of the ferrule and from end to end.

In the form of invention shown in Figures 15 to 20, as well as in the other disclosed forms of invention, the pre-loading of the clutch from the interior thereof and from the interior of the tappet body builds in the clutch a self contained inwardly acting power avoiding the need of contracting the clutch by an outside force such as would result from the use of a nut threaded about the clutch.

In summarizing the various forms of the invention, it will be seen that the same contemplates a tappet in which the tappet screw receiving body is formed with a threaded, annular spring clutch having substantial portions thereof originally in the path of advance of the tappet screw with the result that the clutch is loaded as an incident to the application of the tappet screw. In this connection it will be seen that by reason of the inward pressing of the spring clutch against the screw, there is established a vastly increased area of frictional engagement between the screw and the mounting therefor.

It is this increased area of frictional engagement that acts in consonance with the spring clutch in securing the tappet screw against shifting. The inherent resiliency of the clutch is more than adequate to compensate for such disturbances as may be due to variations in temperature from which it is said that the screw will remain undisturbed under a wide range of operating conditions. More particularly, the frictional stress exerted on the tappet screw acts to prevent uncontrolled turning of the tappet screw in either direction and in this way there is prevented shortening or elongation of the tappet.

What is claimed is:—

1. In a tappet, a ferrule provided with internal threads, a tappet screw threaded into the ferrule, said ferrule being constricted between the ends thereof and having circumferentially spaced slots defining an annular series of clutch elements having threads, said clutch elements having substantial portions thereof in the path of advance of the tappet screw so that the clutch elements are loaded and rendered self-acting and caused to exert a radial inwardly directed force as an incident to the advance of the tappet screw, and a tappet body receiving and protecting the clutch elements and being in bracing and centering engagement with the ferrule beyond opposite ends of the clutch elements, the threads of said clutch elements having upper and lower flanks urged by the clutch elements into frictional engagement with the complementary flanks of the thread of the tappet screw.

2. In a valve actuating mechanism for internal combustion engines, a ferrule provided with internal threads, a tappet screw threaded into the ferrule, said ferrule being provided between the ends thereof with a constricted portion having an annular series of spaced parallel longitudinally extending slots terminating short of the ends of the ferrule thereby defining an annular series of tappet screw engaging threaded clutch elements and unbroken annuli joined with the ends of the clutch elements, said clutch elements being bowed toward the longitudinal center of the ferrule and being in the path of advance of the tappet screw so that the clutch elements are loaded as an incident to the advance of the tappet screw, and a tappet body receiving the slotted portion of the ferrule and protecting the same, said tappet body being in bracing engagement with said annuli to preserve the concentricity of the ferrule.

3. In a valve actuating mechanism for internal combustion engines, a ferrule having internal threads provided with upper and lower flanks, and a tappet screw in the ferrule and having a thread provided with upper and lower flanks, said ferrule being provided between the ends thereof with an internally reduced portion formed with spaced slots defining intervening inwardly directed threaded clutch elements, said clutch element being in pressure engagement with said tappet screw and establishing frictional contact between the upper and lower flanks of the threads of the ferrule and the upper and lower flanks of the threads of the tappet screw, said slots terminating short of the ends of the ferrule thereby leaving unbroken annuli at the ends of the clutch elements and integral therewith for the support of the clutch elements from both ends thereof, and a tappet body receiving and protecting the slotted portion of the ferrule and being in bracing engagement with one of said annuli.

4. In a valve actuating mechanism for internal combustion engines, a tappet body having a threaded constricted portion formed with a series of slots defining an annular series of threaded clutch elements, and a tappet screw threaded into said tappet body and having threaded engagement with said clutch elements, said clutch elements being in the path of advance of the tappet screw so that the application of the tappet screw forces the clutch elements outward and thus loads the same, said body being provided at the ends of the constricted portion thereof with unbroken annular portions formed integral with said threaded clutch elements.

5. In a valve actuating mechanism for internal combustion engines, a tappet screw having threads, and a threaded member receiving said tappet screw and provided at a point spaced from one end thereof with a constricted portion formed with a series of slots defining longitudinally curved threaded clutch elements in the path of advance of said screw so that the application of the tappet screw forces the clutch elements outward and thus loads the clutch elements from the inner sides thereof and from the interior of the tappet screw receiving member for effective frictional restraining engagement with the screw, said member being provided at the ends of the clutch elements with unbroken annular portions formed integral with the clutch elements and limiting movement thereof.

6. In a valve actuating mechanism for internal combustion engines, a ferrule provided with internal threads, a tappet screw threaded into the ferrule, said ferrule being provided between the ends thereof with a constricted portion having a slot defining a spring clutch having an interior surface threaded for engagement with the tappet screw, the ends portions of the ferrule being formed with unbroken annuli joined with the ends of the clutch to brace the same, and a tappet body receiving and protecting the slotted portion of the ferrule and being in bracing relation to said annuli.

7. In a valve actuating mechanism for internal combustion engines, a ferrule provided with internal threads, a tappet screw threaded into the ferrule, said ferrule being provided between the ends thereof with a constricted portion having a slot defining a spring clutch having an interior surface threaded for engagement with the tappet screw, the end portions of the ferrule being formed with unbroken annuli joined with the ends of the clutch to brace the same, and a tappet body receiving and protecting the slotted portion of the ferrule and being in bracing relation to said annuli, said spring clutch having the said interior threaded surface thereof bowed from end to end toward the longitudinal center of the ferrule.

8. In a valve actuating mechanism for internal combustion engines, a ferrule provided with internal threads, a tappet screw threaded into the ferrule, said ferrule being provided between the ends thereof with a constricted portion having an annular series of spaced grooves terminating short of the ends of the ferrule thereby defining an annular series of tappet screw engaging clutch elements and unbroken annuli at the ends of the clutch elements, said clutch elements being bowed toward the longitudinal center of the ferrule and being in the path of advance of the tappet screw so that the clutch elements are loaded as an incident to the advance of the tappet screw, and a tappet body receiving the grooved portion of the ferrule and protecting the same, said tappet body being in bracing engagement with said annuli to preserve the concentricity of the ferrule.

9. In a valve actuating mechanism for internal combustion engines, a tubular member having a threaded bore and provided at a point between the ends thereof with a radially resilient constricted portion constituting a spring clutch of tubular form and reducing the adjacent portion of the bore, and a longitudinally adjustable tappet screw in said bore and in expansive engagement with said spring clutch to load the same from the inner side thereof, said tubular member being provided with unbroken annuli joined with opposite ends of the spring clutch to maintain the initially tubular form thereof against the twisting strain incident to adjustment of the tappet screw.

10. In a valve actuating mechanism for internal combustion engines, a tappet screw receiving ferrule provided with a series of grooves terminating short of the ends of the ferrule and defining clutch elements, a tappet screw threaded into said ferrule, said clutch elements being in the path of advance of the tappet screw so that the application of the tappet screw has the effect of loading the clutch elements from the inner sides thereof, and a tappet body receiving and shielding the clutch elements.

11. In a valve actuating mechanism for internal combustion engines, a tappet screw receiving ferrule provided with a series of angularly directed grooves terminating short of the ends of the ferrule and defining spirally extending clutch elements, a tappet screw threaded into said ferrule, said clutch elements being in the path of advance of the tappet screw so that the application of the tappet screw has the effect of loading the clutch elements from the inner sides thereof, and a tappet body receiving and shielding the clutch elements.

12. In a valve actuating mechanism for internal combustion engines, a tappet body, a tappet screw receiving ferrule in the body and provided with a series of angularly directed grooves terminating short of the ends of the ferrule and defining spirally extending clutch elements, and a tappet screw threaded into the ferrule, the clutch elements being in the path of advance of the tappet screw so that the application of the tappet screw has the effect of loading the clutch elements from the inner sides thereof, said ferrule having unbroken annuli formed integral with the ends of said clutch elements.

13. In a valve actuating mechanism for internal combustion engines, a tappet body having a constricted portion formed with an annular series of internally threaded clutch elements arranged about a common axis, and a tappet screw threaded into said tappet body and having threaded engagement with said clutch elements, said clutch elements being in the path of advance of the tappet screw to an operative range so that the application of the tapet screw forces the clutch elements outwardly and thus loads the clutch elements from within the tappet body, said body being provided at the ends of the constricted portion thereof with means joined with the said clutch elements to strengthen the clutch elements and maintain the same about a common axis.

14. In a valve actuating mechanism for internal combustion engines, an internally threaded tappet body having a portion thereof initially constricted and formed with a radially yieldable clutch having a contractile force, a tappet screw threaded into said tappet body in expansive engagement with said clutch to load the same from the interior thereof, said body being provided with unbroken annuli joined with the opposite ends of the clutch.

15. In a valve actuating mechanism, a tubular member having a threaded bore and provided at a point between the ends thereof with an inwardly bowed resilient portion constituting a spring clutch, and a member threaded into said bore in expansive engagement with said spring clutch to load the same from the interior thereof, said tubular member being provided with means joined with the opposite ends of the spring clutch to resist radial expansion of the clutch.

ALBERT STOLL.